United States Patent [19]

Arntsen et al.

[11] Patent Number: 4,631,362

[45] Date of Patent: Dec. 23, 1986

[54] LOW RESISTANCE ORIGINATION SCAN CIRCUIT

[75] Inventors: Tom D. Arntsen, Boonton, N.J.; Milton L. Embree; Joseph H. Havens, both of Reading, Pa.; Rouben Toumani, Randolph, N.J.

[73] Assignee: AT&T Bell Laboratories, Murray Hill, N.J.

[21] Appl. No.: 655,372

[22] Filed: Sep. 27, 1984

[51] Int. Cl.⁴ .............................................. H04M 3/22
[52] U.S. Cl. ................................................. 379/384
[58] Field of Search ........ 179/18 FA, 18 HB, 16 AA, 179/81 R, 84 R, 170 NC, 70, 77, 18 FG, 18 FF

[56] References Cited

U.S. PATENT DOCUMENTS

| | | | |
|---|---|---|---|
| 3,855,420 | 12/1974 | Steidl | 179/17 A |
| 4,099,032 | 7/1978 | Roge et al. | 179/18 FA |
| 4,115,664 | 9/1978 | Laface et al. | 179/84 R |
| 4,319,093 | 3/1982 | Bars | 179/23 |
| 4,320,260 | 3/1982 | Lechner | 179/18 FA |
| 4,322,586 | 3/1982 | Mein et al. | 179/170 NC |
| 4,358,645 | 11/1982 | Brown | 179/170 NC |
| 4,360,709 | 11/1982 | Hamazato et al. | 179/18 FA |
| 4,385,336 | 5/1983 | Takeshita et al. | 361/42 |
| 4,406,929 | 9/1983 | Pace et al. | 179/170 NC |
| 4,419,542 | 12/1983 | Embree et al. | 179/77 |
| 4,451,703 | 5/1984 | Brightman et al. | 179/18 FA |
| 4,454,477 | 6/1984 | Joffe | 328/149 |
| 4,563,547 | 1/1986 | Booth | 179/16 AA |

Primary Examiner—Gene Z. Rubinson
Assistant Examiner—R. Vaas
Attorney, Agent, or Firm—Charles Scott Phelan

[57] ABSTRACT

An origination scan circuit for detecting circuit closure state in a loop circuit has a much lower impedance than does the typical loop circuit. Its source impedance is split into separate resistive parts for connecting opposite terminals of an office battery to the tip and ring leads of the loop. Currents in the separate resistive parts are sensed and summed for comparison against a threshold current to indicate whether or not a subscriber station on the loop is off hook. Threshold current magnitude is variable to accommodate loop start and ground start applications. When the off-hook state is detected, the origination scan circuit is disabled by switching open the resistive part connections, and loop current is thereafter provided by other suitable means. Automatic current limiting arrangements are included for converting the switching functions to high impedance circuit elements.

15 Claims, 3 Drawing Figures

LOW RESISTANCE ORIGINATION SCAN CIRCUIT

FIELD OF THE INVENTION

This invention relates to circuit closure detecting arrangements and particularly to those useful for off-hook detection in telephone subscriber loop circuits.

BACKGROUND OF THE INVENTION

Numerous on-hook/off-hook circuit state detectors are known in the art for indicating, in response to attainment of at least a predetermined minimum current level, in a telephone subscriber loop circuit that the subscriber has taken the station from the on-hook state to the off-hook state. In that state the station set hook switch is closed and telephone central office battery current can flow at a sufficient level to sustain operation of the subscriber station set for communication purposes. Some detectors of that type sense current in each line circuit conductor, i.e., the tip and ring conductors, and determine from the sensed current levels at least whether or not the subscriber station is in the off-hook state. Some examples are noted below.

A U.S. Pat. No. 4,115,664 to C. Laface et al., is directed to a loop current detecting circuit in which current is sensed and information coupled via optical couplers in each conductor to decision logic circuitry. The sensed signals are logically combined to distinguish between current flow in one or both conductors.

A telephone system supervisory circuit is shown in a U.S. Pat. No. 3,855,420 to R. E. Steidl. That circuit uses current sensing transistors to detect currents, and the combined states of the transistors define predetermined supervisory states.

In U.S. Pat. No. 4,360,709 to K. Hamazato et al., telephone loop closure detection is performed by circuits which generate signals proportional to tip and ring currents, respectively. Sensing resistors are effective in the circuit between office battery and the loop at all times. Sensing signals are summed and compared to a reference voltage to produce a signal indicative of the results of the comparison.

A hook status detector in a subscriber loop interface circuit of U.S. Pat. No. 4,406,929 to W. D. Pace et al. responds to the occurrence of loop current to develop a voltage which is compared to a reference to indicate an off-hook state. Sensing currents are coupled through series resistors which are large compared to the closed-circuit resistances usually found in loop circuits. In the off-hook state of loop operation, the sensing circuits are always energized to maintain the operative state of associated battery feed circuits.

SUMMARY OF THE INVENTION

A hook state detecting circuit, herein usually called an origination scan circuit, is provided separately from the battery feed circuit of a telephone line circuit and has such a low source impedance, compared to the subscriber loop circuit impedance, that even in the worst case operative currents for on-hook and off-hook states are so widely different that the origination scan circuit can readily detect the difference without expensive, sophisticated, high-sensitivity circuits. That source impedance is resistive and is split into separate parts for connecting opposite terminals of an office battery to tip and ring connection terminals of the circuit. Currents in the separate resistors are scaled, summed, and thresholded to determine whether a subscriber station set on the loop is off hook or on hook.

In one embodiment, the detection of the off-hook state causes the origination scan circuit to be powered down as the line feed circuit powers up. Because the low-valued resistors in the origination scan circuit conduct a large current for only a short time, they are of very low wattage and are thus easily implemented in integrated circuit technology. A current limiting function is also provided.

BRIEF DESCRIPTION OF THE DRAWINGS

A more complete understanding of the invention and its various features, objects, and advantages can be obtained from a consideration of the following detailed description in connection with the appended claims and the attached drawings in which:

DETAILED DESCRIPTION

Figure 1:
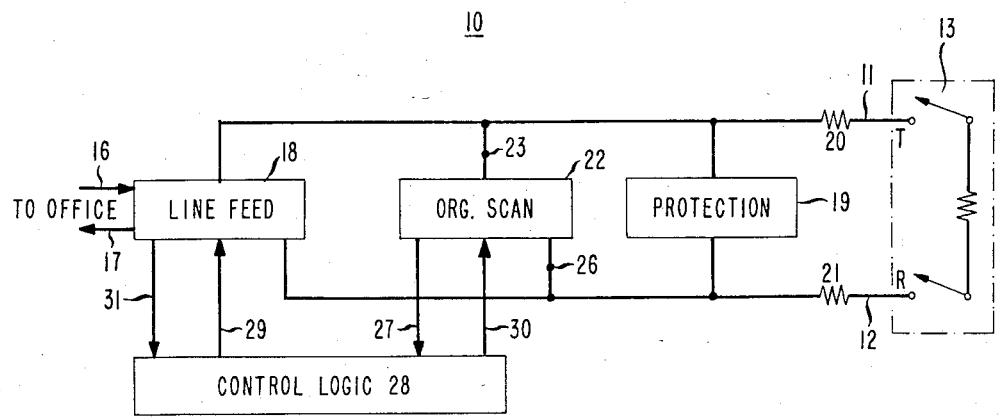
FIG. 1 ,is a functional diagram of a telephone subscriber line interface unit utilizing the invention.

In FIG. 1, a line interface unit 10, or channel unit, interfaces between tip and ring leads 11 and 12 of a subscriber line, or loop, circuit and a pair of two-wire circuits 16 and 17 extending to office equipment such as switching or multiplexing equipment of a carrier system. A subscriber station set is schematically represented by a block 13 including a resistor and switch hook contacts to connect the resistor between the tip and ring leads. Office battery supply rails (not separately shown) are included in the circuit blocks of this figure. An electronic line, or battery, feed circuit 18 advantageously provides current to the loop circuit during off-hook operating times when the switch hook contacts are closed. Circuit 18 is, for example, of the type shown in a copending U.S. patent application Ser. No. 635,209, filed July 27, 1984, of R. Toumani (Case 6), entitled "Electronic Battery Feed Circuit For Telephone Systems," and which is assigned to the same assignee as the present application. Such an electronic battery feed circuit is conveniently integratable and performs other circuit functions, including hybrid transformation between two-wire and four-wire circuits. A protection circuit 19 is connected in parallel with the line feed circuit 18, and that parallel combination is connected through protection resistors 20 and 21 to the tip and ring leads, respectively, of the subscriber loop. Resistors 20 and 21 are typically low valued resistors compared to loop resistance, and in one embodiment they had values of 68 ohms each.

In accordance with the present invention, one interface function not performed in the line feed circuit 18 is the initial off-hook state detection. This function is advantageously performed by an origination scan circuit 22 which is also connected, through terminals 23 and 26, in parallel with circuits 18 and 19. As will be subsequently described, origination scan circuit 22 is in an active, or powered up, condition during the on-hook state on the subscriber loop; and in that condition it supplies and monitors the tip and ring current that may be required. At such times the line feed circuit 18 is powered down to reduce power dissipation. When the subscriber goes off hook, the resulting increase in loop current flow is detected in the origination scan circuit; and a corresponding signal is sent on a lead 27 to a control logic circuit 28, which is also part of the channel unit. Logic circuit 28 correspondingly turns on the line feed circuit 18 power conditioning function by applying a signal on a lead 29. Likewise, a signal is applied from logic circuit 28 via a lead 30 to turn off the origination scan circuit 22 in a manner to be described. It will be appreciated that the control logic function just described is that of a set/reset bistable circuit having its complementary outputs connected to leads 29 and 30. In its off state, circuit 22 presents such a high impedance between terminals 23 and 26 that it has no significant effect on channel unit operation; and line feed circuit 18 supplies line current to the subscriber loop in the usual manner.

When the subscriber goes on hook again, the resulting high loop resistance and low loop current cause the line feed circuit to produce a corresponding signal on a lead 31 to the control logic circuit 28. For example, in a line feed circuit, such as in the aforementioned line feed circuit, a direct current profiling circuit is provided, and its output in a direct current feedback path changes abruptly when the station set goes on hook; and that change is detected, by circuits not separately shown, to produce the signal on lead 31. Logic circuit 28 responds by changing the signals on leads 29 and 30 to power down the line feed circuit 18 and power up the origination scan circuit 22.

Figure 2:
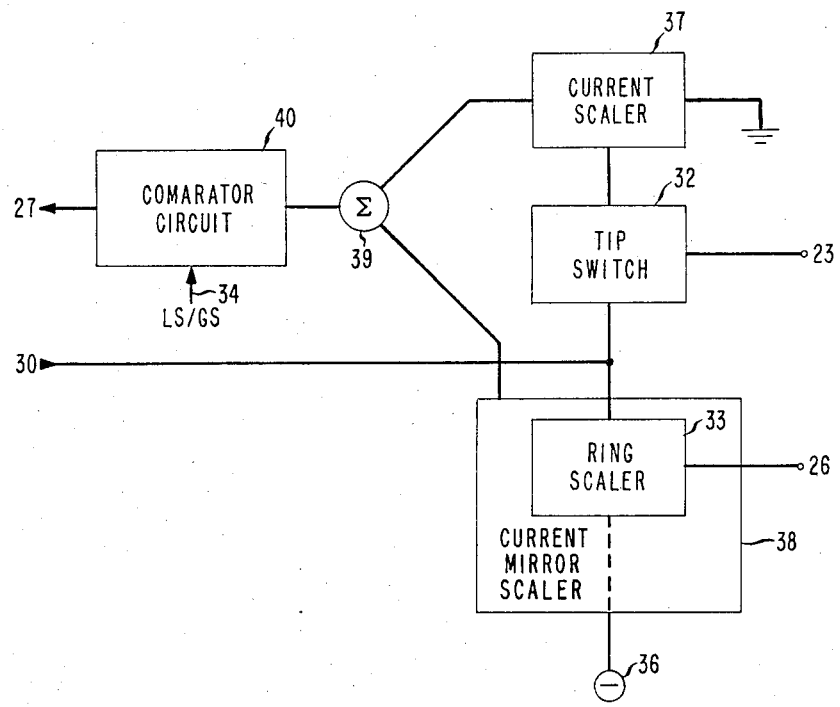
FIG. 2 is a functional diagram of an origination scan circuit in accordance with the invention and utilized in the unit of FIG. 1.

FIG. 2 is a functional block diagram of the origination scan circuit 22 of FIG. 1 and shows the use of tip and ring switches 32 and 33 to implement the on/off function of the circuit 22. When circuit 22 is actively monitoring loop circuit state, those switches are closed; and the loop is in its highest impedance state; and any necessary leakage currents are coupled from the office supply rails, schematically represented by a negative supply 36 and ground, through the switches 32 and 33 and two current scalers 37 and 38. Scaler 38 is illustratively implemented as a current mirror. Supply 36 is illustratively minus 48 volts. Switch 32 is in series with the input to current scaler 37, and switch 33 includes the master transistor in the input side of current mirror scaler 38. When the subscriber station set 13 goes off hook, current from the supply rails increases in a path from ground through current scaler 37, tip switch 32, tip terminal 23, the loop, ring terminal 26, and ring switch 33 and current mirror scaler 38 to supply 36. The amount of current flowing depends upon the length of the subscriber loop.

Current scaler 37 and current mirror scaler 38 provide reduced proportional versions of tip and ring currents to different inputs of an analog summing circuit 39, the output of which is applied to an input of a comparator circuit 40. In the comparator, the sum signal is compared to a predetermined threshold current advantageously selected to represent the worst case (longest loop) minimum required operating loop current. If the threshold is exceeded, the comparator output changes to so indicate to the control logic via lead 27. A lead 34 is provided for applying a loop-start/ground-start (LS/GS) signal which is used in a manner to be described for modifying the magnitude of the threshold to accommodate the type, loop-start or ground-start, of subscriber loop to be served by the line interface unit. It will be appreciated that this method of summing scaled versions of the currents sensed in the tip and ring conductors of the subscriber loop lends the origination scan circuit insensitivity to longitudinal signals on the loop. Thus, a 60 Hertz longitudinal signal on the subscriber loop increases and decreases at terminals 23 and 26 together. That longitudinal effect combines with metallic current at any given instant to enhance the total current on one of the tip or ring switches 32 or 33 and decrease the current in the other switch. Consequently, the scaled versions of the longitudinal component cancel in summer 39.

Figure 3:
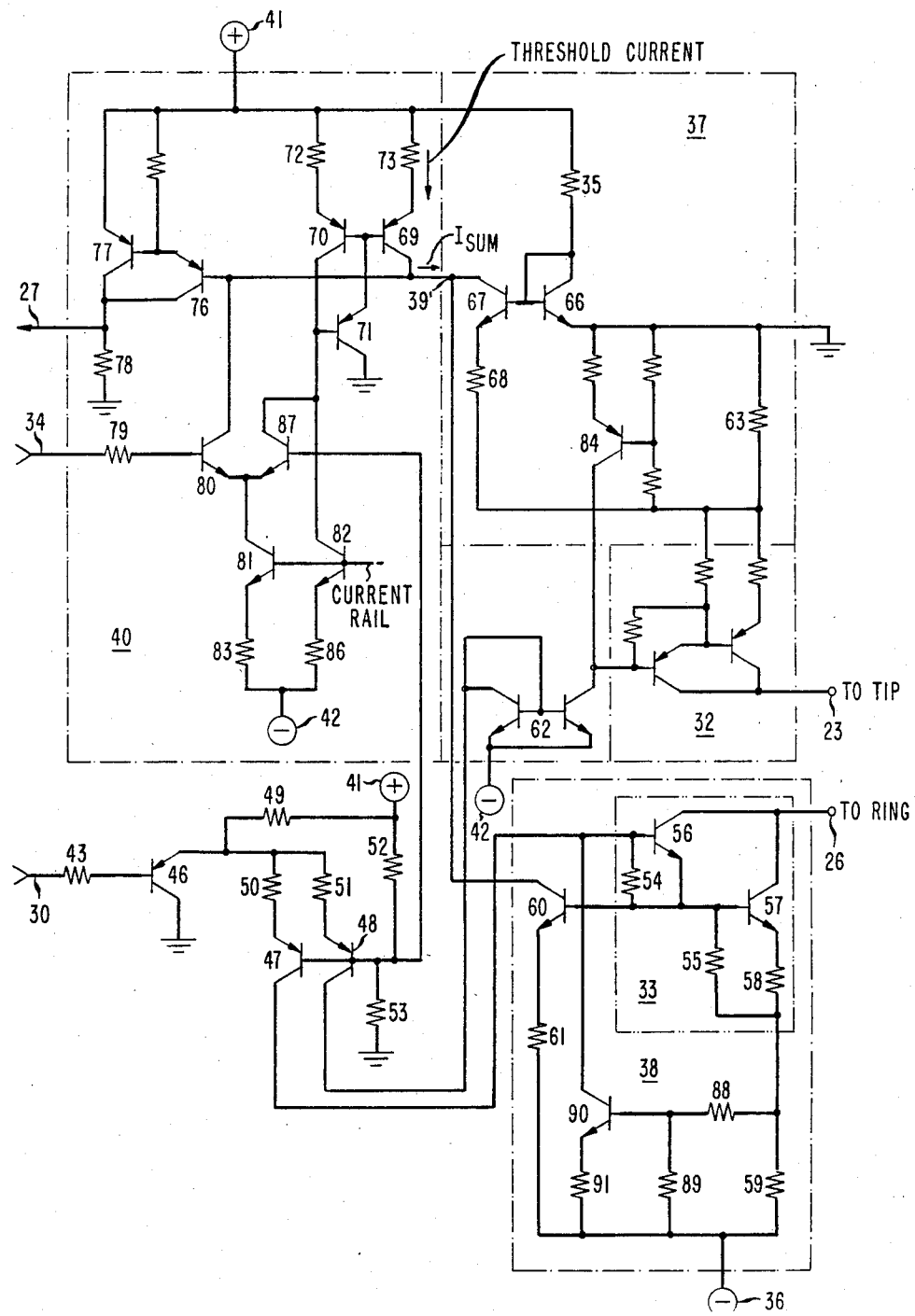
FIG. 3 is a schematic diagram of the circuit of FIG. 2.

FIG. 3 depicts a schematic diagram of an illustrative embodiment of the functions of the circuit of FIG. 2. Like reference characters are employed to indicate circuit elements which are the same as those in FIG. 1. The embodiment is illustratively implemented using plus and minus, 5−, volt, ground referenced supplies 41 and 42.

A binary signal on lead 30 from control logic 28 determines whether the circuit 22 of FIG. 3 is on (powered up) or off (powered down). In the high state, e.g., +5 volts, of that signal applied through a coupling resistor 43 to a base terminal of a pnp transistor 46, that transistor is biased off. Turning off transistor 46 allows pnp transistors 47 and 48 to conduct current through their respective equal emitter resistors 50 and 51 from supply 41 through a common resistor 49. The level of that conduction is set by the emitter series resistances 50 and 51, the common resistor 49, and the base bias established by a potential divider including resistors 52 and 53 connected in series across supply 41. That base bias, illustratively about 2 volts, is selected to establish a reasonable switching threshold for the binary signal on lead 30. The resistors 49, 50 and 51 are selected to cause transistors 47 and 48 to supply sufficient current to enable conduction in switches 32 and 33. The same base bias is also supplied to comparator 40 for a purpose to be described. In the low state, e.g., ground, of the lead 30 signal, transistor 46 conducts thereby lowering the emitter voltages of transistors 47 and 48 so that they are rendered nonconducting. Therefore, switches 32 and 33 are necessarily disabled in their open circuit condition.

Switches 32 and 33 are Darlington type switches of essentially the same configuration. In switch 33, the Darlington connection includes npn transistors 56 and 57; and transistor 56 receives at its base electrode the transistor 47 collector current. Collector terminals of transistors 56 and 57 are connected to ring terminal 26, and the emitter of transistor 57 is connected to supply 36 by the series combination of resistors 58 and 59. The combined resistance of those two resistors and their counterparts on the tip side of the circuit is less than the anticipated loop circuit resistance to which the origination scan circuit will be connected. In one embodiment, resistor 58 was about 3.75 ohms and resistor 59 was about 80 ohms. Such low resistances necessarily results in relatively high current flow when a connected subscriber station set goes into its off-hook state; but, as previously mentioned, the origination scan circuit will be powered down in response to that event. That large current is advantageously accommodated by employing multiple, e.g., sixteen in one embodiment, parallel-connected transistors to implement the transistor 57; and in that implementation the resistor 58 schematically represents the combined resistance of the emitter ballasting resistors normally employed in such a combination.

A resistor 54, between base and emitter of transistor 56, and a resistor 55, between the base of transistor 57 and the common circuit point between resistors 58 and 59, conduct the collector-base capacitor currents caused by fast voltage variations on terminal 26 to prevent false turn-on of switch 33.

Darlington transistor 57 also performs the master transistor function of the current mirror circuit 38. Accordingly, less semiconductor area is required than would be the case if the switch and master transistor functions were accomplished by separate multiple transistor sets able to handle the ring current. The current of transistor 57 is mirrored to a slave current path including an npn transistor 60 and its emitter resistor 61. The mirrored current is scaled down by a factor of about 100 by properly ratioing resistors 61 and 59.

Control signal current from transistor 48 for switch 32 is inverted in a current mirror 62 so it can be utilized in the switch, which employs pnp transistors. Aside from conductivity type, switch 32 is identical to switch 33; and it is connected in series with a resistor 63, corresponding to resistor 59, between ground and the tip terminal 23. The current scaler 37 includes a voltage-to-current conversion arrangement connected across a resistor 63. In that arrangement are a diode-connected npn transistor 66 and a common base npn transistor 67 as well as a resistor 63 and a resistor 68 for factoring down the off-hook current of switch 32 by the same ratio as previously mentioned for the current mirror scaler 38. Resistor 35 in the current scaler 37 is chosen so that the current in diode connected transistor 66 will be in the range of the current expected in transistor 67 near the hook status detection threshold. Under this condition, the $V_{BE}$'s of transistors 66 and 67 will be approximately equal which means that the voltage at the emitter of transistor 67 will be approximately equal to zero. As a result, the current in resistor 68 will be equal to the current through resistor 63 multiplied by the ratio of resistor 63 to resistor 68. Since the alpha of transistor 67 is advantageously approximately equal to unity, the collector current of transistor 67 is approximately equal to the current through resistor 68.

By tying resistor 63 to ground and providing for a virtual ground at the emitter of transistor 67, the use of a diode biased transistor, such as the transistor 66, in series and between ground and resistor 63 is avoided. Avoiding connection of transistor 66 in the tip current path from ground is desirable since that transistor in that path would have to be implemented by a multiple-transistor set requiring substantial extra semiconductor area.

Output currents of the current scaler 37 and current mirror 38 are summed at a node 39', and the combined current is drawn from comparing circuit 40. In the latter circuit, a pnp transistor 69 conducts a certain threshold current. That transistor is a slave transistor in a current mirror connection including a master pnp transistor 70 and a helper pnp transistor 71 having its base-emitter junction connected across the base collector junction of transistor 70. Current in transistor 70, and hence the threshold current in transistor 69, is fixed in accordance with the state of the LS/GS signal on lead 34 as previously mentioned. Emitter resistors 72 and 73 for transistors 70 and 69 are selected to provide any suitable ratio between the emitter currents, and the resistor 72 is advantageously a trimmable resistor for convenient factory setting of that ratio to achieve the desired threshold current. When a subscriber station is on hook, the sum current at node 39' is less than the threshold current which can be supplied by transistor 69; and transistor 69 saturates, sinking the excess current through transistor 71. However, when the station is taken off hook, the summed current from node 39' exceeds the threshold current which can be supplied by transistor 69 and the excess current is drawn from the base terminal of a pnp transistor 76 which is arranged with another pnp transistor 77 in a Darlington connection. That action draws transistors 76 and 77 into conduction and increases the potential drop across the collector resistor 78 to ground thereby signaling the control logic 28 that the subscriber has gone off hook.

Threshold current in comparing circuit 40 is advantageously set to a value corresponding to the minimum allowable loop off-hook current, i.e., that for the longest expected loop given worst case manufacturing tolerances and environmental conditions. In one loop start embodiment, that threshold current was about 300 microamperes. About half of that current is needed for ground start operation where only ring lead current flows initially when the station set is taken off hook. The LS/GS signal is utilized to control the appropriate threshold to accommodate the loop start or ground start character of the subscriber loop to which the origination scan circuit is to be connected.

The LS/GS signal is applied through a coupling resistor 79; and when it is low, e.g., ground, it biases an npn transistor 80 off; so the collector current of another npn transistor 81 flows through an npn transistor 87 instead of transistor 80. Transistor 81, and another npn transistor 82 are connected as current sources with emitter resistors 83 and 86 for determining the current in transistor 70. Bases of transistors 81 and 82 are provided with a current rail type of bias, e.g., by connection to a base terminal of a master transistor in a current mirror arrangement not otherwise shown. The collector terminal of transistor 82 is directly connected to the collector of transistor 70; and an npn transistor 87, which is base biased the same as transistors 47 and 48, is provided for connecting the collectors of transistors 70 and 81. When transistor 80 is off, as just described, transistor 87 is on; and the currents from transistors 81 and 82 are summed and applied to the collector of transistor 70 to provide the full current needed to set the aforementioned larger threshold current needed for loop start operation. When the LS/GS signal on lead 34 is high, however, transistor 80 is on to supply all the current that transistor 81 can handle and transistor 87 is turned off. Therefore, only a portion of the prior threshold current is available as is required for the ground-start option.

A current limiting function is provided in the circuit of FIG. 3 to protect the physical integrity of the switches 32 and 33 and their associated resistors in the event of a short loop condition, a power cross, a large current surge from the power supply leads, or other large voltage occurrence on the subscriber loop. This function is provided in the current scaler 37 and the current mirror scaler 38 by utilizing a fraction of the voltage drop across resistors 59 and 63 to initiate limiting of the circuit current that flows through switches 32 and 33. Thus, in the current mirror 38, occurrence of an excessive current flow in resistor 59 develops a sufficient potential difference across a parallel connected potential divider, including resistors 88 and 89, to bias a normally nonconducting npn transistor 90 into conduction at a sufficient level to deprive switch 33 of sufficient drive current to bring its Darlington transistors out of saturation and increase the collector-emitter voltage difference of transistor 57. That collector-emitter voltage of transistor 57 varies with the external load, so as to limit the voltage drop across resistor 59, and thereby limits the current in resistor 59 and switch 33. Resistors 88 and 89 are advantageously proportioned so that an equilibrium is achieved at a desired level of current in resistor 59. That proportioning is achieved by selecting those resistors so that the product of the limiting current level, resistor 59, and the ratio of the resistance of resistor 89 to the sum of the resistances of resistors 88 and 89 is equal to the turn-on voltage for transistor 90. Resistor 91 is included in the emitter path of transistor 90 to suppress any tendency of the described limiting function to oscillate. A similar limiting function is provided on the tip side using a pnp transistor 84 to supply current to the slave transistor of current mirror 62 and thereby starve the Darlington connected transistors of switch 32.

Although the present invention has been described in connection with a particular embodiment thereof, it is to be understood that additional embodiments, applications, and modifications thereof which will be obvious to those skilled in the art are included within the spirit and scope of the invention.

What is claimed is:

1. An origination scan circuit for monitoring a telephone subscriber loop circuit state to detect a subscriber off-hook condition and comprising
    tip and ring termainals for making connection to a subscriber loop circuit,
    first and second resistance means connected in series between said tip and ring terminals, respectively, and connections for a supply voltage,
    means for sensing current level in each of said resistance means,
    means, responsive to an output of said sensing means, for producing and indicating signal upon the occurrence in at least one of said tip and ring terminals and its associated resistance means of current in excess of condition,
    means for switchably connecting said first and second resistance means to respective ones of said tip and ring connections, and
    means, responsive to said indicating signal representing detection of loop current in excess of said predetermined level, for actuating said switchably connecting means to disconnect said first and second resistance means from said tip and ring connection terminals.

2. The origination scan circuit in accordance with claim 1 in which said producing means includes
    means for summing sensing means outputs for each of said resistance means whereby longitudinal portions of sensed signals are reduced,
    means for comparing an output of said summing means to a predetermined threshold value of current corresponding to said predetermined level, and
    means, responsive to a predetermined output state of said comparing means, for providing said indicating signal.

3. The origination scan circuit in accordance with claim 2 in which said comparing means comprises
    means for providing a threshold current of said predetermined threshold value,
    means, responsive to said summing means output being equal to or less than said threshold current, for supplying said summing means output from said current providing means and sinking any remaining portion of said threshold current, and
    means, responsive to said summing means output being greater than said threshold current, for actuating said indicating signal producing means.

4. The origination scan circuit in accordance with claim 2 in which said comparing means comprises
    means for providing a current of said predetermined threshold value, and
    means for controlling said current providing means to produce one of a predetermined plurality of threshold current values.

5. The origination scan circuit in accordance with claim 4 in which said controlling means comprises
    means for establishing a first predetermined current in said threshold current providing means,
    means for switchably supplementing said first predetermined current by a second predetermined current, and
    means for receiving signals for controlling said supplementing means.

6. The origination scan circuit in accordance with claim 1 in which said switchably connecting means comprises
    first and second transistor switches of complementary conductivity types, each switch comprising
    a pair of Darlington connected transistors having their collector-emitter paths connected in series with a corresponding one of said resistance means, and
    means, responsive to said actuating means, for biasing said transistors nonconducting.

7. The origination scan circuit in accordance with claim 1 in which
    said sensing means comprises first and second current scalers,
    means are provided for connecting said first and second resistance means in said first and second current scalers, respectively, and
    means are provided for connecting an output current of each of said current scalers to said producing means.

8. The origination scan circuit in accordance with claim 7 in which one of said current scalers comprises
    a current mirror including master and slave transistor means and one of said resistance means, and
    means for connecting one of said switching means, which is connected to said one of said resistance means in such one scaler, to operate also as said master transistor means of such one scaler.

9. The origination scan circuit in accordance with claim 7 in which one of said current scalers comprises
    a voltage-to-current conversion means connected across one of said resistance means, and
    comprising first and second transistors having a common base connection, said second transistor being diode connected,
    a current scaling resistor connected in series with an internal collector-emitter path of said first transistor between said output of said one current scaler and one end of said one resistance means,
    means connecting an emitter of said second transistor to another end of said one resistance means, and
    means for biasing said second transistor to produce therein a base-emitter voltage drop that is approximately the same as a base-emitter voltage drop in said first transistor in response to loop current at approximately said predetermined level.

10. The origination scan circuit in accordance with claim 7 in which each of said current scalers includes
   means for producing a scaled output current which is much smaller than the current in the one of said resistance means included therein.

11. The origination scan circuit in accordance with claim 7 in which
   first and second limiting means are provided in association with respective ones of said first and second transistor switches and each of said limiting means comprises
      means, responsive to attainment of a further predetermined current level in a corresponding one of said resistance means, for biasing the corresponding one of said transistor switches to prevent further increase in circuit current.

12. The origination scan circuit in accordance with claim 11 in which said biasing means comprises
   a transistor, normally nonconducting in the presence of current less than said further predetermined current level in said corresponding one of said resistance means, connected to divert actuating signal from an input of said corresponding one of said transistor switches, and
   means for applying a predetermined fraction of the voltage across said corresponding one of said resistance means to a base terminal of said transistor, said fraction being selected such that the voltage at said base terminal, upon occurrence of said further predetermined current level, is sufficient to turn on said transistor.

13. The origination scan circuit in accordance with claim 1 in which are provided
   means for switchably connecting said first and second resistance means to respective ones of said tip and ring terminals, and
   means, responsive to current in said resistance means in excess of a further and higher predetermined level of current, for actuating said switchably connecting means to limit current therein and in said first and second resistance means.

14. The origination scan circuit in accordance with claim 13 in which
   said switchably connecting means comprises first and second transistor switches of complementary conductivity types, and
   said actuating means comprises
      a transistor, normally nonconducting in the presence of current less than said further predetermined current level in said corresponding one of said resistance means, connected to divert actuating signal from an input of said corresponding one of said transistor switches, and
      potential dividing means including first and second resistors connected in series across said corresponding one of said resistance means and having a divider tapping connection to a base terminal of said transistor from a series connection circuit point between said first and second resistors, said first and second resistors having values proportioned such that the product of said further predetermined current level, said corresponding one of said resistance means, and the ratio of one of said resistors to their sum is equal to a voltage sufficient to turn on said transistor.

15. In a telephone system having at least one subscriber loop circuit altrrnatively connectable either to an origination scan circuit for monitoring a telephone subscriber loop circuit state to detect a subscriber off-hook condition or to a battery feed circuit including sensing resistors in series with tip and ring conductors, respectively, of said loop circuit, said origination scan circuit comprising
   tip and ring terminals for making connection to a subscriber loop circuit,
   first and second resistance means connected in series between said tip and ring terminals, respectively, and connections for a supply voltage, each of said first and second resistance means having a resisitance substantially smaller than one of said sensing resistors,
   means for sensing current level in each of said resistance means,
   means, responsive to an output of said sensing means, for producing an indicating signal upon the occurrence in at least one of said tip and ring terminals and its associated resistance means of current in excess of a predetermined level,
   means for switchably connecting said first and second resistance means to respective ones of said tip and ring connections, and
   means, responsive to said indicating signal representing detection of loop current in excess of said predetermined level, for actuating said switchably connecting means to disconnect said first and second resistance means for said tip and ring connection terminals.

* * * * *

UNITED STATES PATENT AND TRADEMARK OFFICE
CERTIFICATE OF CORRECTION

PATENT NO. : 4,631,362

DATED : December 23, 1986

INVENTOR(S) : Tom D. Arntsen, Milton L. Embree, Joseph H. Havens and Rouben Toumani It is certified that error appears in the above—identified patent and that said Letters Patent is hereby corrected as shown below:

Column 7, line 40, "excess of condition," should read --excess of a predetermined level corresponding to said off-hook condition,--.

Signed and Sealed this

First Day of December, 1987

Attest:

DONALD J. QUIGG

*Attesting Officer*  *Commissioner of Patents and Trademarks*